US005745864A

United States Patent [19]

Hosoe et al.

[11] Patent Number: 5,745,864

[45] Date of Patent: Apr. 28, 1998

[54] VEHICULAR INFORMATION STORAGE DEVICE AND POWER OUTAGE-RESISTANT STORAGE SYSTEM AND METHOD FOR THE SAME

[75] Inventors: Katsuharu Hosoe, Okazaki; Teruyoshi Itoh, Kaizu-gun; Toshihisa Yamamoto, Kariya, all of Japan

[73] Assignee: Nippondenso Co., Ltd., Kariya, Japan

[21] Appl. No.: 538,234

[22] Filed: Oct. 3, 1995

[30] Foreign Application Priority Data

Oct. 4, 1994 [JP] Japan .................................... 6-240400
Oct. 26, 1994 [JP] Japan .................................... 6-262294

[51] Int. Cl.$^6$ ........................... G06F 17/00; G01M 15/00

[52] U.S. Cl. .............................. 701/35; 701/29; 340/438; 340/439; 73/117.3

[58] Field of Search ....................... 364/424.04, 424.034; 340/438, 439; 73/117.3

[56] References Cited

U.S. PATENT DOCUMENTS

| | | | |
|---|---|---|---|
| Re. 31,997 | 10/1985 | Klötzner | 364/431.12 |
| 5,019,799 | 5/1991 | Oshiage et al. | 340/438 |
| 5,111,686 | 5/1992 | Kamiya et al. | 73/117.3 |
| 5,200,600 | 4/1993 | Shinagwa | 235/492 |
| 5,243,324 | 9/1993 | Bober | 340/439 |
| 5,280,438 | 1/1994 | Kanemaru | 364/561 |
| 5,327,551 | 7/1994 | Kaneko | 395/182.03 |
| 5,590,040 | 12/1996 | Abe et al. | 364/424.04 |

FOREIGN PATENT DOCUMENTS

| | | |
|---|---|---|
| 4-123472 | 11/1992 | Japan . |
| 5-143470 | 6/1993 | Japan . |
| 6-066198 | 3/1994 | Japan . |

*Primary Examiner*—Tan Q. Nguyen
*Attorney, Agent, or Firm*—Cushman Darby & Cushman IP Group of Pillsbury Madison & Sutro LLP

[57] ABSTRACT

A vehicular information storage device includes an EEPROM, an extracting device which processes and extracts vehicle information, a determination device which determines from among regions set beforehand the region of the extracted information, and a counting device for incrementing a counter in correspondence with the region determined by the determination device. The needed information is extracted properly at a predetermined period along with the determination of the region where such information belongs. Further, the EEPROM used by the system is composed of three data regions with all three data regions set to a reset state at an initial state. The data regions are decremented sequentially at a minimum period required by a measurement parameter. Since updating from "1" to "0" is possible for individual cells and there is no need for resetting, processing time is reduced. Also, when data in one of the data regions is determined to be irregular due to, e.g., a power outage, it can be restored using the count values of the two other data regions.

22 Claims, 9 Drawing Sheets

VEHICULAR INFORMATION STORAGE DEVICE AND POWER OUTAGE-RESISTANT STORAGE SYSTEM AND METHOD FOR THE SAME

CROSS-REFERENCE TO RELATED APPLICATIONS

This application is related to and claims priority from Japanese Patent Application Nos. Hei. 6-240400 and Hei. 6-262294, incorporated herein by reference.

BACKGROUND OF THE INVENTION

1. Field of the Invention

The present invention relates to a vehicular information storage device which stores vehicular information on a long-term basis and which allows the readout of such information in case of need. More particularly, the invention relates to such devices which use an EEPROM which can restore data destroyed when electrical power is turned off during data entry and which can measure time exceeding a limit of the number of times for the EEPROM can be updated.

2. Description of Related Art

In recent years, various kinds of devices which store internal combustion engine operational history (for example, frequency of usage for various speeds) in memory and which read such information to be used as information for breakdown diagnosis and maintenance have been investigated.

One well-known vehicular information storage device is disclosed in Japanese Patent Laid Open Publication No. Hei. 6-66198. This device determines if vehicular information is at a predetermined region for every predetermined time interval (period) and discloses technology for storing diagnostic data by incrementing a counter provided at a predetermined region of a nonvolatile memory (standby RAM) for the region that was determined.

Meanwhile, for the case when a long-term record of the vehicle is to be kept or when diagnostic data is to be stored in a limited memory space, storing data within the widened predetermined time interval is the same as cropping data and in doing so, there is a chance for vital data to be cropped and thus, the reliability of the stored diagnostic data drops.

Further, most of these devices use an EEPROM as a timer for measuring time or as a counter for measuring the frequency of usage. When time or the accumulation of past data are successively entered in the EEPROM, electrical power might be cut off during data entry. For this case, with the use of the EEPROM,. because data still remains even after electric power cut-off, it is possible to use these data in updating the succeeding data when electric power is switched on again if the contents of such data are correct.

However, if electric power is cut off while data entry to the EEPROM is in progress, one situation occurs in which it is not possible to clearly determine whether the contents of the EEPROM (the data of each cell) are the contents before update, the contents after update or unstable contents which are generated temporarily during data entry.

In general, because the EEPROM stores electric charge at its floating gate, then the construction of its cell allows the update of "1" data to "0" data and thus, updating the cells from "1" to "0" individually. (for each cell) is possible. On the other hand, updating "0" data to "1" by releasing the stored electric charge cannot be performed selectively for each cell but, instead, can be performed only for an entire IC or for closely-knit groups (for example, the smallest possible unit which consists of 4-bits or 8-bits). Moreover, when updating cell data from "1" to "0", there are differences in the characteristics between each cell in that there are cells that can be updated in a short period of time while there are other cells that need a long period of time for updating.

Accordingly, in order to ensure the execution of updates, the manufacturer usually gives assurances on the adequacy of time for updating by securing the time needed for updating the cell which takes a long time, i.e., for the worst-case situation. Moreover, the user designs accordingly to secure that amount of time. If electric power is turned off during this time interval needed for updating, there might be some cells that are in the transient state (this occurs at high probabilities for cells which take a long time for rewriting). For this case, when electric power is switched on again, there is a possibility that the contents of the data that will be entered to the microcomputer from the EEPROM will be entirely different from the data before updating or the data after updating.

In particular, for the internal combustion engine operational history storage device, there are instances when the timing for turning off the ignition key to turn off the internal combustion engine coincides with the timing for updating the EEPROM. Here, to continuously record the operational history of the internal combustion engine, there is a need to be able to restore the original data if the data left when the electric power is turned off is incomplete. For this purpose, for example, the majority-rules principle can be used by copying the same data on three pages and considering data correct when two out of three pages have the same contents.

However, for this kind of method, three page regions are needed for storing the same data and three times the number of steps is necessary to update one data and thus, the probability that the electric power switches off during the update of the EEPROM is much higher. Also, processing time for the EEPROM is longer and thus there are chances that the other processes will be affected.

One way of dealing with this inconvenience is as disclosed in Japanese Patent Laid-Open Publication No. Hei. 5-1413470. Here, uniting each cell data which are based on the electric charge stored by the floating gate as one cell region unit, two pairs of cell regions are provided for each cell region unit with the previous data being written on one pair of cell regions while new data are being written on the other pair, with the erasure of the previous data written on one pair being performed after the completion of the input of the new data. The invention here discloses technology on the alternate execution of the writing of new data and the erasure of old data between two pairs of cell regions.

For this method, two cell regions are considered as one pair and by providing two pairs and their sequential alternate updating enables the reduction of steps needed for renewal as well as the restoration of data even if electric power is cut-off during data updating. However, in this method, a total of four regions of cells are needed for one data and in the same way as the majority-rules method which uses three pages, the problem of having to provide multiple data regions for data remains unsolved. Also, in general, due to the structure of its cells, there is a limit to the number of revisions that can be executed (for example, counting as one the process of deleting data and writing new data, the limit is about 10,000 times). For this reason, when using timers or the like, measurements cannot be performed when the number of projected revisions on the cell exceeds a predetermined number. Therefore, when the limit to the number of revisions on the cell is reached, complicated procedures such as using another cell to start counting again have to be taken.

SUMMARY OF THE INVENTION

In view of the foregoing problems of the prior art in mind, it is a goal of the present invention to provide a vehicular information storage device which reliably stores information needed for the long-term analysis of the vehicle by extracting and processing information to be stored from among finely-sampled vehicular information at a predetermined interval.

It is an additional goal of the present invention to provide an internal combustion engine operational history storage device which reduces the possibility of electric power switching off and the subsequent destruction of data by restoring data destroyed when electric power is turned off during the update of the contents of the data, together with the effective usage of EEPROM cells by limiting the number of cells needed for a measurement item and reducing the number of steps needed in updating the EEPROM.

To achieve the above-mentioned aims, one aspect of the present invention provides a vehicular information storage device which includes a storage device retaining its stored contents even during electric power cut-off, an extracting device which processes information needed for the analysis and maintenance of vehicular and internal combustion engines, wherein such information pertains to a predetermined period of time, and which extracts the information at a predetermined time interval, a determination device which determines from among regions set beforehand the region of the information extracted by the extracting device, and a counting device for incrementing a counter set in a predetermined storage region of the storage device in correspondence with the region determined by the determination device.

According to this aspect, the determination device determines from among regions set beforehand the region of the information extracted by the extracting device at every predetermined period of time for the analysis and maintenance of the vehicle and the internal combustion engine. Accordingly, the needed information is extracted properly at the predetermined period along with the determination of the region where such information belongs. Then, the counting device increments the counter which is provided in a predetermined region of the memory device in correspondence with the region determined and stores such information as the frequency information for each region.

In this way, because the necessary information is extracted at every predetermined period, and is stored and maintained on a long-term basis inside a small-size memory without fail, such information can be useful in the analysis and maintenance of the vehicle and the internal combustion engine with possible improvements in the reliability of such information.

Another aspect of the present invention provides a vehicular information storage device where an extracting device extracts one or more maximum or minimum values of the information within the predetermined time interval.

In this way, the extracting device extracts one or more values from among maximum and minimum values within the predetermined time interval. Such maximum and minimum values are information that are used later in the analysis and maintenance of vehicles and internal combustion engines.

The vehicular information storage device may have a determination device which determines the storage region based on the amount of change in the information within the predetermined period of time. In this way, the determination device, for example, computes the amount of change in the information by extracting information about engine rotation or the like at the predetermined period and comparing it with the information when the engine is in full rotation. Accordingly, the vehicle can determine accurately the acceleration and normal states of the internal combustion engine, and by storing this information separately, the usage conditions which apply the greatest stress on the vehicle and the internal combustion engine are determined, and such information is used in the analysis and maintenance of vehicles and internal combustion engines.

Another aspect of the present invention achieves these aims by providing an internal combustion engine operational history storage device which measures time using an EEPROM and which includes three or more data regions which are set in such an EEPROM and which store data for a measurement item, a counting device for counting the data stored in such data regions and a data computation device which treats as measured data a total of the data counted by the counting device and stored in the data regions.

In this way, the count values of such three or more data regions are added by the data computation device and used as one measurement data. Thus, the required counting is performed within the allowable number of updates on the EEPROM. In addition, time measurement is performed efficiently while satisfying both maximum count value and minimum time unit constraints.

It is possible that the system includes a data restoration device for restoring a count value for a data region based on the count values of the other data regions after an irregularity is detected in the data of such data region through comparison of the data stored in the data regions. In this way, while the data of one data region among the three or more data regions may be destroyed when electric power is turned off during data update, such data is recovered using the data restoration device through the simple comparison with the data of the other data regions. Thus, the restoration of data is performed at high speed by simply cross-referencing the data of three or more data regions and thus, data is recovered without affecting the other processes.

Also, it is possible that the counting device performs countdown operations starting from a reset state of the EEPROM with such reset state as the initial state. Because reset operations are not needed when switching from "1" to "0", performing countdown operations reduces the number of reset operations as compared to the case when countup is performed. Thus, a high-speed counting operation which does not affect the other operations is performed.

Further, the counting device, during countdown operations, may determine if there is a need to erase the EEPROM and perform such erasure only when there is such a need. In this way, the number of erasure operations is reduced by determining beforehand if there is a need for reset operations. Thus, high-speed counting operations are performed without affecting the other processes.

Still further, it is possible that the counting device, during countdown operations, omits reset operations during odd-numbered operations and performs such reset operations only during even-numbered operations. In this way, during countdown operations starting from the reset state, the odd-numbered operation involves switching from "1" to "0" and thus, there is no need for reset operations. Accordingly, this reduces the number of reset operations. On the other hand, updating during even-numbered operations is performed only after executing reset operations. Therefore, since the number of reset operations is halved since such operations are performed for every other period, high-speed counting operations which do not affect the other processes are performed.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY PREFERRED EXEMPLARY EMBODIMENTS

Preferred embodiments of the present invention are described hereinafter with reference to the accompanying drawings.

Figure 1:
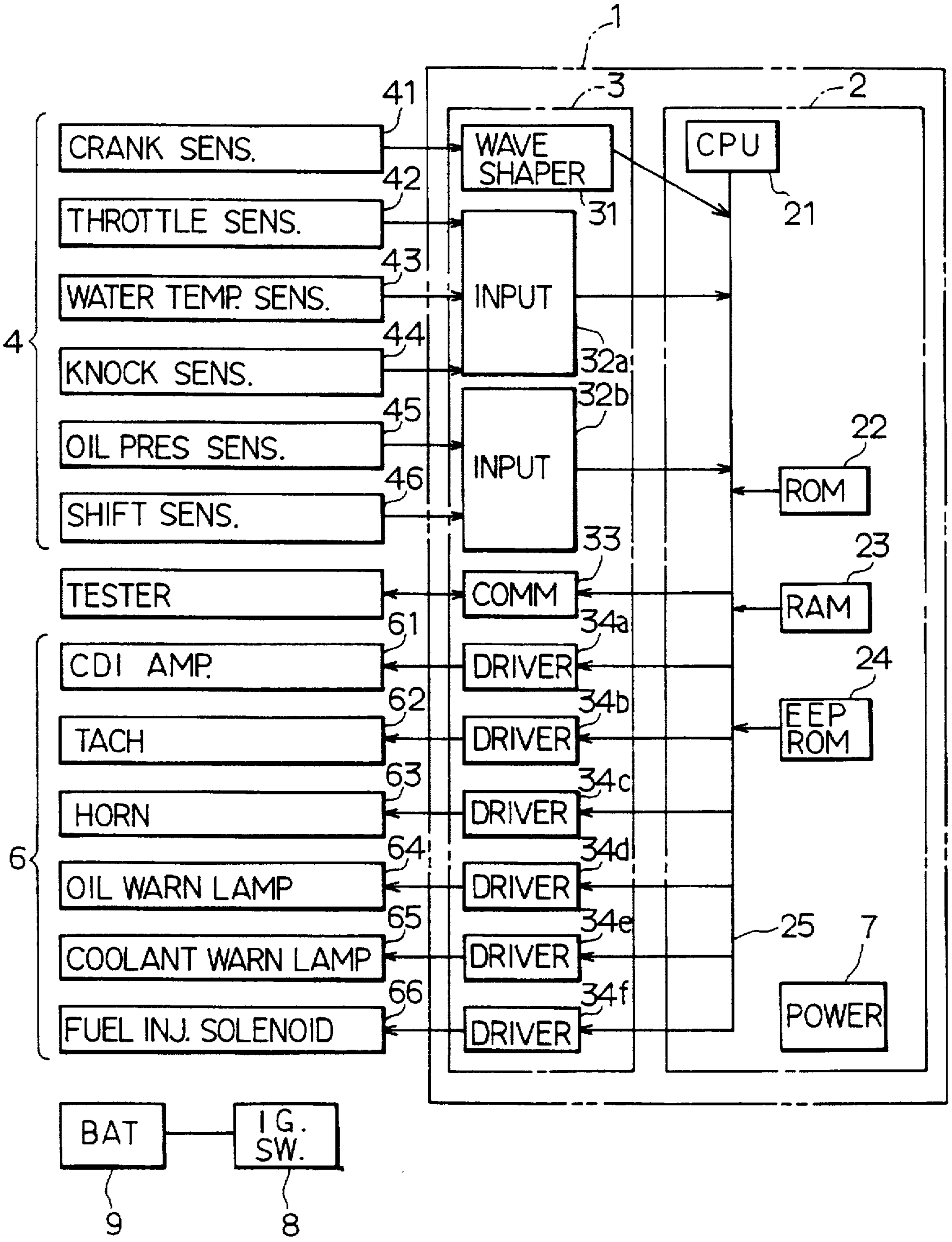
FIG. 1 is a block diagram showing an ECU which includes a vehicular information storage device according to a first embodiment of the present invention.

FIG. 1 is a block diagram showing an ECU (Electronic Control Unit) 1 and its peripheral devices according to a first embodiment of the present invention.

As shown in FIG. 1, the ECU 1 includes a microcomputer 2 and input/output interface circuits 3. Sensors 4, testers 5 for diagnosing breakdowns and actuators 6 are connected to the ECU 1. The microcomputer 2 includes a CPU 21, a ROM 22 which stores control programs, a RAM 23 for storing various kinds of information and an EEPROM (Electrically Erasable Programmable ROM) 24, all of which are interconnected through a bus line 25.

Moreover, the input/output interface circuits 3 include a waveform shaping circuit 31, input circuits 32*a*, 32*b*, a communication circuit 33 and driving circuits 34*a*–34*f*. The waveform shaping circuit 31 shapes an input signal from a crank sensor 41 which is one of the sensors 4 and which detects the rotation of the crankshaft, and then provides it to the microcomputer 2. The input circuit 32*a* provides the microcomputer 2 with input signals from a throttle sensor 42 which is one of the sensors and which detects a throttle opening, a coolant temperature sensor 43 which detects the coolant temperature of the internal combustion engine (not shown in this Figure) and a knock sensor 44 which detects the knock state of the internal combustion engine. The input circuit 32*b* provides the microcomputer with input signals from an oil switch 45 which detects oil pressure and a shift switch 46 which detects a shift position of the automatic transmission 46, both of which belong to the group of switches 4. The communication circuit 33 performs data transmission between a tester 5 which is used for diagnosing breakdowns and the microcomputer 2. Based on the output signal of the microcomputer 2, the driving circuits 34*a*–34*f* provide driving signals to the following actuators: a CDI (Capacitive Discharge Ignition) amplifier 61, a tachometer 62, a warning horn 63, an oil warning lamp 64, a coolant temperature warning lamp 65 and a fuel increase solenoid 66.

Figure 2:
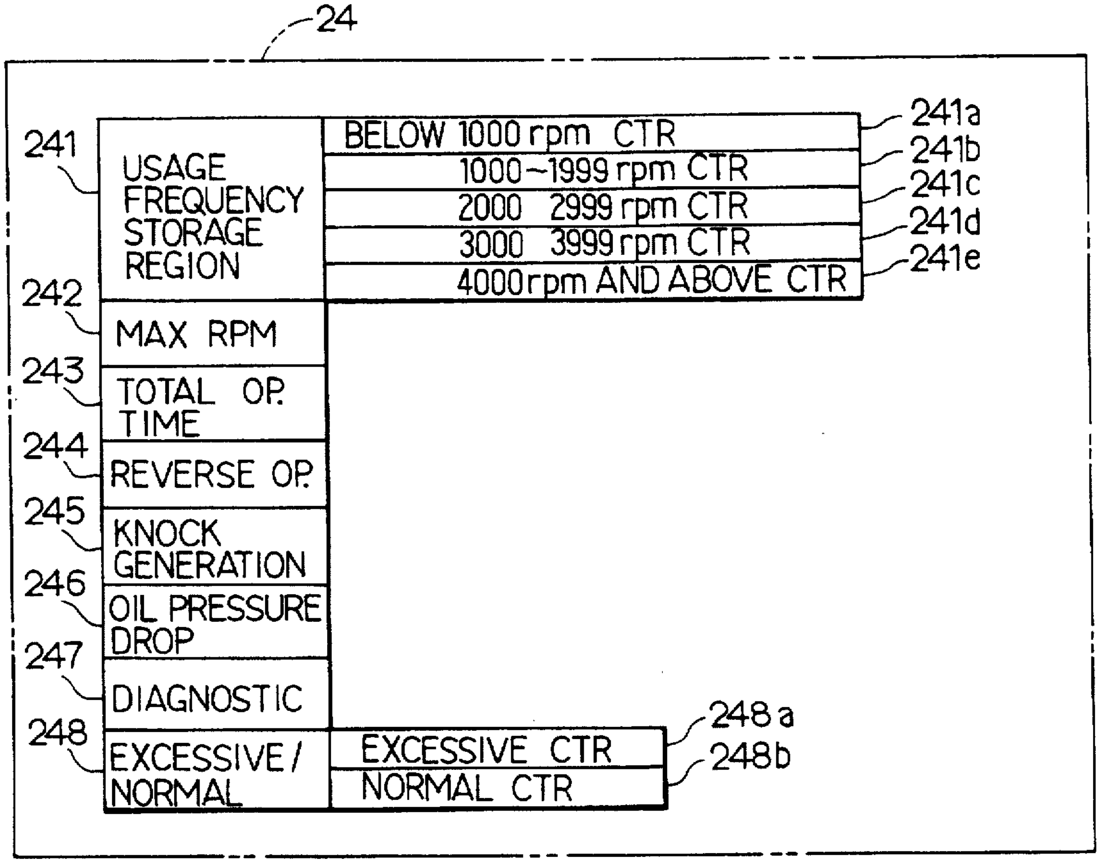
FIG. 2 is a block diagram showing the construction of an EEPROM used in the vehicular information storage device.

FIG. 2 shows the construction of the memory region of EEPROM 24. A storage region 241 for storing the information on the frequency of usage at each of the different speed ranges is divided into the following storage regions: below 1000 rpm counter 241*a*, 1000–1999 rpm counter 241*b*, 2000–2999 rpm counter 241*c*, 3000–3999 rpm counter 241*d* and 4000 rpm and above counter 241*e*. Also, EEPROM 24 provides storage space for a maximum rotational speed information storage region 242, a total operational time information storage region 243, a reverse rotation information storage region 244, a knock generation information storage region 245, an oil pressure decline information storage region 246, a diagnostic information storage region 247, an engine normal/excessive state usage frequency information storage region 248 including excessive usage frequency counter 248 and normal usage frequency counter 248*b*, and the like.

Figure 3:
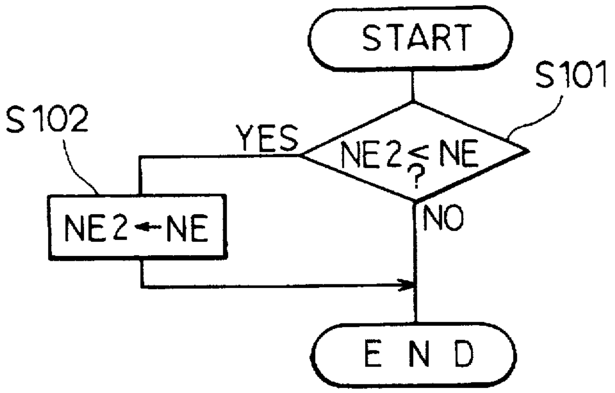
FIG. 3 is a flowchart showing the processing procedure of the CPU used in the vehicular information storage device for computing the maximum engine rotation of the internal combustion engine.
Figure 4:
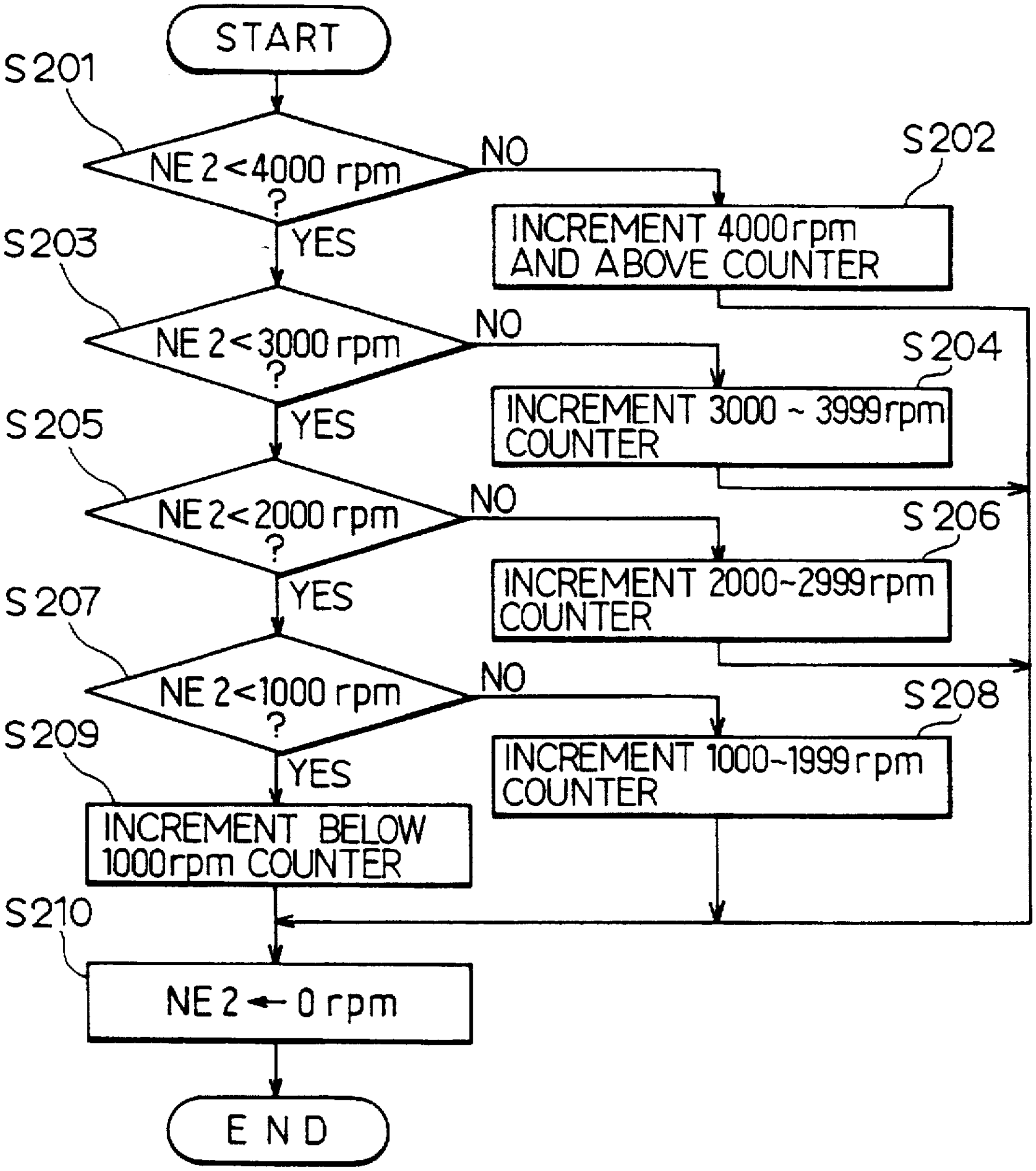
FIG. 4 is a flowchart showing the processing procedure of the CPU used in the vehicular information storage device for measuring the frequency of usage at each rotational speed of the internal combustion engine.

Next, for the CPU 21 used in the vehicular information storage device according to the first embodiment of the present invention, the processing procedures for extracting the maximum engine rotational speed from the engine rotational speed which represents vital internal combustion engine information and for recording at the predetermined period the frequency of usage for each engine rotational speed as the usage frequency information are explained using the flowcharts of FIGS. 3 and 4, respectively.

FIG. 3 shows the routine for computing the maximum engine rotational speed of the internal combustion engine which is executed every time the engine rotational speed is computed. For example, the maximum speed may be computed at every 90° CA (i.e., every 90° change in the crank angle).

Step S101 determines if a present engine rotational speed NE exceeds a maximum engine rotational speed NE2 of the predetermined period. If so, then control proceeds to step S102 where the present engine rotational speed NE is set as the maximum engine rotational speed NE2 and in doing so, the maximum engine rotational speed for the period is stored and the execution of this routine ends. On the other hand, if the condition of step S101 is not satisfied, the maximum engine rotational speed is left as is and the execution of this routine ends.

FIG. 4 shows the routine for measuring the usage frequency at each engine rotational speed of the internal combustion engine. This routine is executed every 160 ms which is the predetermined period.

Step S201 checks if the maximum engine rotational speed NE2 stored in the maximum engine rotational speed computation routine of FIG. 3 is below 4000 rpm. If the condition of step S201 is not satisfied, control goes to step S202 which increments 4000 rpm and over counter 241*e* of the storage region 241 of the information on the usage frequency at each rotational speed which is inside the EEPROM 24 of FIG. 2. On the other hand, if the condition of step S201 is satisfied, then control proceeds to step S203 which determines if the maximum engine rotational speed NE2 is below 3000 rpm. If the condition of step S203 is not satisfied, control goes to step S204 which increments 3000–3999 rpm counter 241*d* of the storage region 241. On the other hand, if the determination condition of step S203 is satisfied, then control proceeds to step S205 which determines if the maximum engine rotational speed NE2 is below 2000 rpm. If the condition of step S205 is not satisfied, control goes to step S206 which increments 2000–2999 rpm counter 241*c* of the storage region 241. On the other hand, if the condition of step S205 is satisfied, then control proceeds to step S207 which determines if the maximum engine rotational speed NE2 is below 1000 rpm. If the condition of step S207 is not satisfied, control goes to step S208 which increments 1000–1999 rpm counter 241*b* of the storage region 241. On the other hand, if the determination condition of step S207 is satisfied, then control proceeds to step S209 which increments 1000 rpm and below counter 241*a* of the storage region 241. After execution of the processes of steps S202, S204, S206 and S208 described above, control proceeds to step S210 which resets the maximum engine rotational speed NE2 of the predetermined period to 0 rpm. After this, the execution of this routine ends.

In this way, the CPU 21 inside the microcomputer 2 of the ECU 1 computes the ignition timing or the like from the engine rotational speed which is computed based on the output signal from crank sensor 4 of the group of sensors 4, provides it to the CDI amplifier 61 which is one of the actuators 6 together with determining which region from among the below 1000 rpm, 1000–1999 rpm, 2000–2999 rpm, 3000–3999 rpm or 4000 rpm and above regions provided beforehand the maximum engine rotational speed, which is obtained after extracting and processing (storing) the input signal information for the predetermined period, belongs to and incrementing for every predetermined period the corresponding below 1000 rpm counter 241*a*, 1000–1999 rpm counter 241*b*, 2000–2999 rpm counter 241*c*, 3000–3999 rpm counter 241*d* and 4000 rpm and above counter 241*e* which are counters provided inside usage frequency information storage region 241 for each rotational speed. Also, the maximum usage rotational speed, total operational time or the like which are useful later for the diagnosis of the vehicle and internal combustion information are stored in the predetermined storage regions inside the EEPROM 24.

Figure 5:
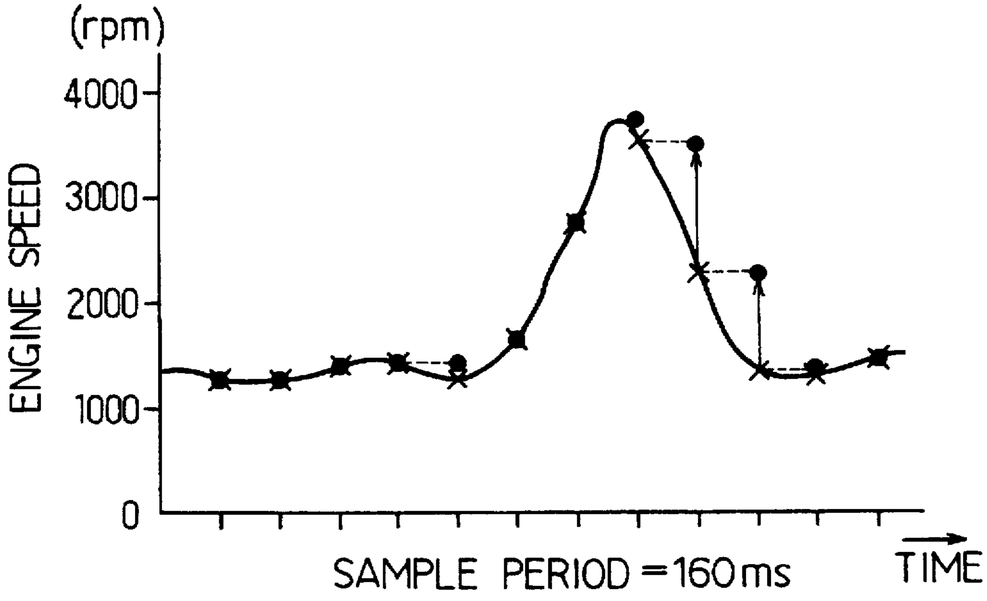
FIG. 5 is an explanatory drawing showing, through a timechart of the transition of the actual engine rotational speed of the internal combustion engine, the engine rotational speed stored and maintained in the vehicular information storage device of the present invention and the engine rotational speed stored and maintained using the conventional method.

Using a timechart which shows the transition of the actual engine rotational speed of the internal combustion engine, FIG. 5 is an explanatory diagram which shows the comparison between the engine rotation frequencies that are stored and maintained in this embodiment and the engine rotation frequencies that are stored and maintained conventionally.

For FIG. 5, because by convention the instantaneous values of the engine rotational speed are recorded at a predetermined read-out timing (predetermined period of 160 msec), the maximum engine rotational speed information generated during the predetermined time interval and which is vital to the analysis of the internal combustion engine is lost. This inconvenience is solved in this embodiment by extracting and processing (peak-hold) for a predetermined time interval (predetermined period of 160 ms) vehicular information which are finely-sampled during each computation of the engine rotational speed, and by storing and retaining the maximum engine rotational speed (marked as a dark circle in FIG. 5) generated within the predetermined time interval.

Figure 6:
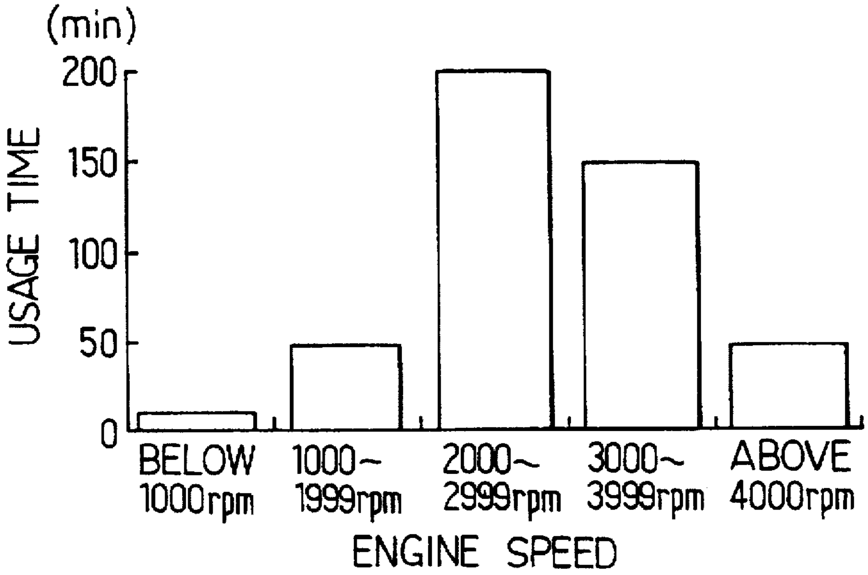
FIG. 6 is a usage frequency distribution diagram showing the relationship of the engine rotational speed with the number of usage hours based on information stored and maintained by the vehicular information storage device.

FIG. 6 is a frequency distribution diagram which shows the relationship established between the engine rotational speed [rpm] for the predetermined region and the usage time [min] based on information read by the diagnostic testers 5 or the like wherein such information is stored in the usage frequency information storage region 241 inside the EEPROM 24.

In this way, the vehicular information storage device of the present embodiment is characterized as having a storage device formed from the EEPROM 24 which retains its stored contents even if electric power is cut off, an extracting device which through the CPU 21 extracts at a predetermined period of 160 msec the maximum engine rotational speed NE2 which represents vital information for the analysis and maintenance of the vehicle and the internal combustion engine, a determination device which through the CPU 21 determines which region the maximum engine rotational speed NE2 extracted by the extracting device is in from among the following regions: below 1000 rpm, 1000–1999 rpm, 2000–2999 rpm, 3000–3999 rpm and 4000 rpm and above, and a counting device which through the CPU 21 increments the counter from among the following counters provided inside the usage frequency information storage region 241 of the EEPROM: below 1000 rpm counter 241*a*, 1000–1999 rpm counter 241*b*, 2000–2999 rpm counter 241*c*, 3000–3999 rpm counter 241*d* and 4000 rpm and above counter 241*e* in correspondence with the region determined by the determination device.

Therefore, the determination device determines the region where the information extracted by the extracting device for every predetermined period of 160 msec and vital to the analysis and maintenance of the vehicle and internal combustion engine exists. Accordingly, information needed for each predetermined period is extracted properly along with the determination of the region where such information belongs. In addition, in correspondence with the region determined, the counting device increments the counter of the predetermined storage region provided inside the storage device and keeps information such as frequency of usage information for each region. Thus, because the necessary information is stored and retained without fail for every predetermined time interval, this information can be used in the analysis and maintenance of the vehicle and the internal combustion engine and thus, this information has improved reliability.

Therefore, maximum engine rotational speed NE2 for each predetermined period of 160 ms which is the maximum value of the information within the predetermined period as extracted by the extracting device is highly reliable information and is useful later in the analysis and maintenance of the vehicle and the internal combustion engine.

Meanwhile, storing information on the minimum engine rotational speed when the internal combustion engine is idle and reading out and analyzing such data using the breakdown diagnostic tester enables the use of such information in the adjustment of carburetors and the like for the stabilization of idle engine rotational speed during maintenance of the internal combustion engine.

In addition, for the long-term storage of the internal combustion engine operational history, data need not be stored directly in the EEPROM at every predetermined period of 160 msec. Instead, secondary processing (for example, remaking the usage frequency distribution diagram of 2000–2999 rpm which takes the maximum value to a usage frequency distribution diagram where the period is one minute) at a period longer than the predetermined period of 160 msec (for example, one minute) of the usage frequency distribution for a predetermined time interval makes long-time storage possible.

Figure 7:
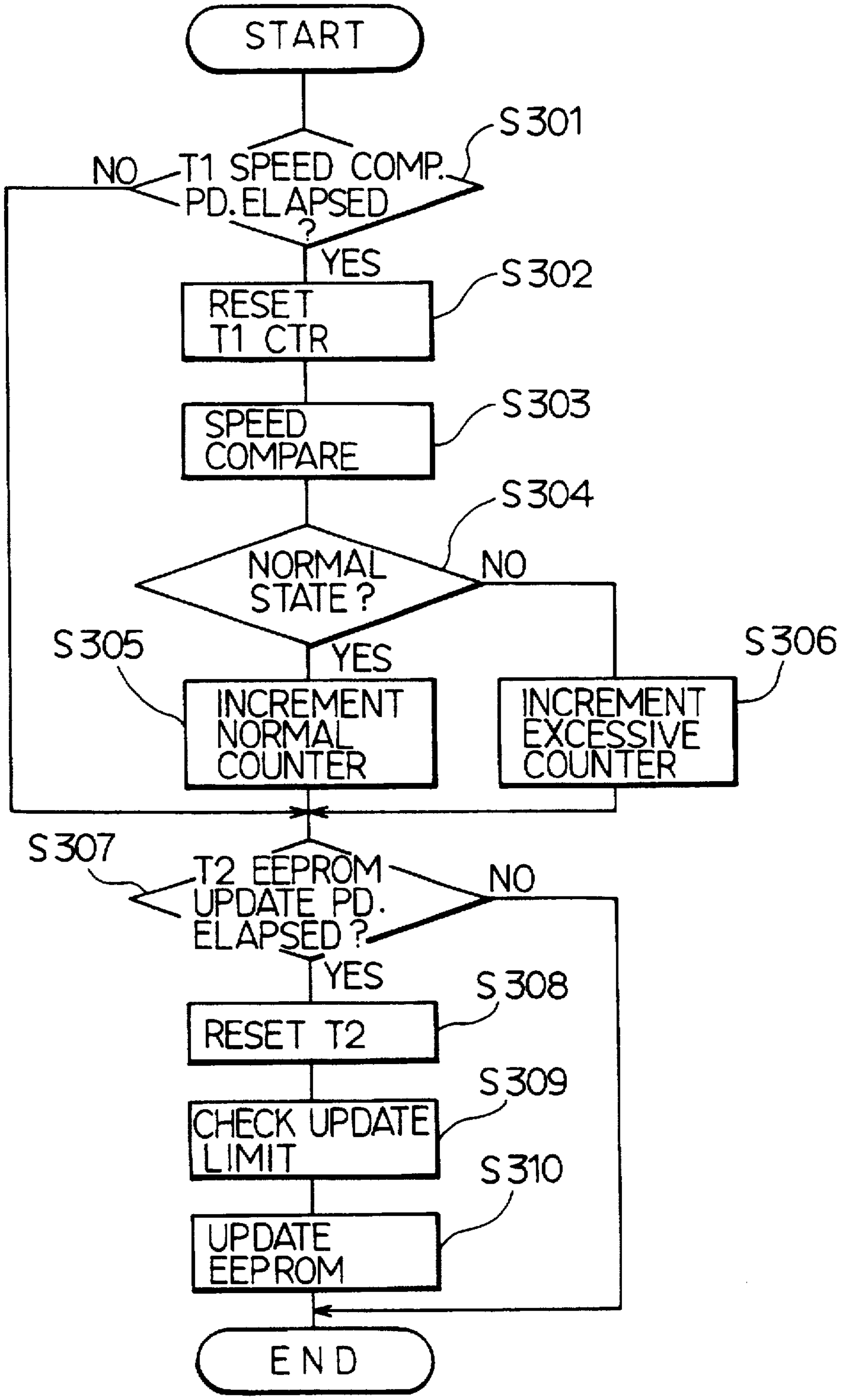
FIG. 7 is a flowchart showing a processing procedure for measuring the frequency of usage at each operational state of the internal combustion engine which are classified into excessive and normal states.
Figure 8:
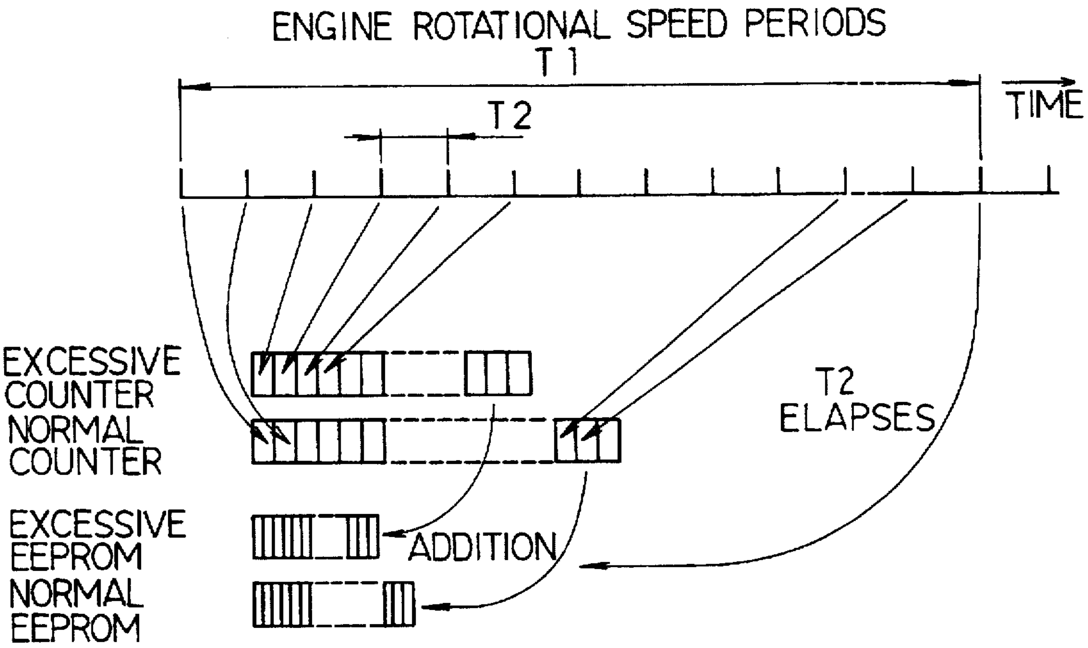
FIG. 8 is a timechart showing the processing procedure for determining the operational state of the internal combustion engine and for measuring the frequency of usage at the normal and excessive states.

Next, FIGS. 7 and 8 are used to explain a method for measuring and recording the frequency of usage of the internal combustion engine after determining whether the engine is in an excessive state or a normal state. FIG. 7 is a flowchart showing an embodiment of a method for determining the excessive and normal state of the internal combustion engine from the engine rotational speed for every predetermined period and recording information in the storage region 24. FIG. 8 is a timechart which shows the measurement and storage processes of the usage frequency at the excessive and normal states of the engine.

For FIG. 7, this routine is executed at every predetermined time interval with step S301 determining if period T1 which is used for determining the state of the engine from the engine rotational speed has elapsed. If period T1 has not yet elapsed, control goes to step S307. If period T1 has elapsed, control goes to step S302 where a T1 period measurement counter is reset. Next, step S303 compares the engine rotation frequencies. This process compares the engine rotational speed before the period T1 and the present rotational speed and if the comparison result is larger than a predetermined value, then the present state is determined to be an excessive state. On the other hand, if the comparison result is smaller than the predetermined value, then the present state is determined to be a normal state. For the present embodiment, the period of T1 is set at one second while the determination value for determining the excessive and normal states is set at 100 rpm. The period T1 and the determination values are set to derive information on the excessive or normal state of the engine.

Next, step S304 determines whether the state of the engine is normal or not based on the determination result of step S303. If the state of the engine is normal, control proceeds to step S305 which increments the normal counter (corresponding to the arrows from the main time line to the normal counter line in FIG. 8). On the other hand, if the engine is in the excessive state, control proceeds to step S306 which increments the excessive counter (corresponding to the arrows from the main time line to the excessive counter line in FIG. 8). The counters used in steps S305 and S306 use RAM. The LSB of the count values of the counters become the execution period T1. The usage frequencies for the normal and excessive states are determined accurately by adjusting the values of this period T1 and the determination value.

Next, control proceeds to step S307 which determines if the time period T2 for updating the EEPROM has elapsed. T2 is set to a time period longer than T1 and is the period for storing data in the vehicular information storage region 24. Here, if period T2 has not yet elapsed, the execution of the processing routine terminates. On the other hand, if period T2 has elapsed, control proceeds to step S308 which resets the T2 counter. Then, control proceeds to step S309 which checks the state of the storage region 24. While the EEPROM is used as the storage device 24 for the present embodiment, this EEPROM 24 generally has a limit to the number of updates that can be made on it and there is a possibility that internal data will be destroyed if updates numbering more than this limit are made. Therefore, step S309 checks the number of updates on the EEPROM 24 and if this number exceeds the limit, further updates are stopped. Generally, periods T1 and T2 mentioned above are set in reference to this limit on the number of updates on the EEPROM 24 and the accuracy of the data. This limit on the updates on the EEPROM 24 also applies to the processes mentioned above on counting the frequency of usage at each engine rotational speed and storing the other information.

If step S309 determines that the number of updates on the EEPROM 24 is below the limit, control proceeds to step S310 where the storage of information to the EEPROM is performed (corresponding to the addition arrows from the normal and excessive counter lines to the normal and excessive EEPROM lines, respectively, in FIG. 8). This information is derived by incrementing the counters for every period T1 and by adding the data provided in the RAM 23 for the excessive and normal states to the corresponding data of the storage regions of the EEPROM 24. This routine ends when the result of this addition is stored in the EEPROM 24.

One important point in this invention is that the information derived every predetermined time interval is based on the change in the information detected during the same predetermined time interval. Accordingly, a representative numerical value stored in the storage region is derived based on all the values that are generated within the predetermined time interval. Also, it is possible to choose the appropriate mathematical method for processing the numerical figures that are generated during the predetermined time interval. Meanwhile, a method for extracting the maximum value as in the present embodiment is useful in evaluating durability while a method for extracting the minimum value is useful in evaluating the idle rotational speed, idle air volume or the like as minimum operational standards of the machine. Also, measuring the frequency of usage at both normal and excessive states of the engine is effective in determining engine stress or the like.

Also, while the EEPROM 24 is used as the storage device for the foregoing embodiment, there is no need to be limited to such a storage device. Any device which retains stored contents even during electric power cut-off can serve as the storage device.

As noted above, the useful life of the EEPROM 24 is limited because it can only be updated a limited number of times. A technique for extending this usable lifetime and for ensuring recovery of the counter data after the system is powered down during a counting operation will now be explained in the context of updating the total operational time storage region 243 of FIG. 2 as an example; however, it should be noted that the technique is preferably used with all EEPROM updating operations.

In the above-described system, normally there is a need to turn off the automobile's ignition key 8 to interrupt the supply of power from the vehicle's battery 9 to the system power supply 7 and thereby stop the internal combustion engine. Therefore, if the internal part of the ECU 1 stores the internal combustion engine operational history, there is a possibility that electric power supply is cut off while the process of updating the data of EEPROM 24, e.g., data in operational time storage region 243, is in progress.

Figure 9:
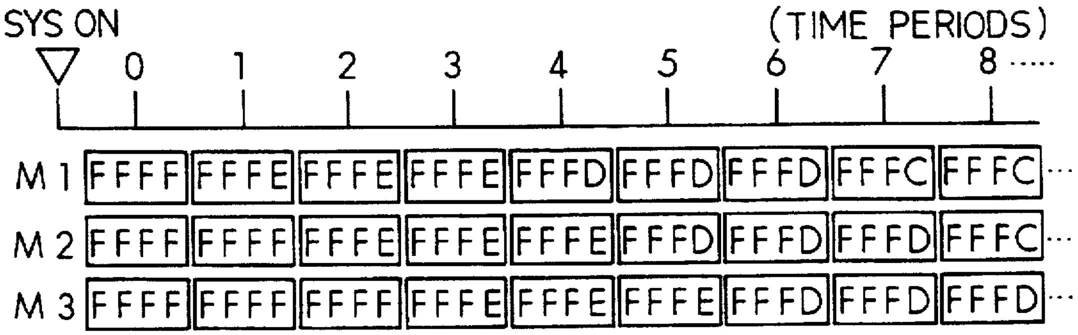
FIG. 9 is an explanatory drawing showing an update method of an EEPROM in the ECU.

Next, the updating method of the EEPROM 24 for the internal combustion engine operational history storage device is explained using FIG. 9. It must be noted here that FIG. 9 shows the operation for the initial stage (at the start of measurements).

In using EEPROM 24 for operational time measurements, count operations are performed at predetermined periods on the EEPROM 24. In this embodiment, using the EEPROM 24, measurement of the operation time of an internal combustion engine or the like is performed. Here, a maximum measurement of time is set at 500 hours with a measurement period set at one minute with the data cell being an 8 bit×2=16 bit counter. With 500 hours equal to 30000 minutes, the limit to the number of times the EEPROM 24 can be updated is set at 10,000 times and if the EEPROM 24 is implemented using one data combination, then the smallest unit which is the LSB (Least Significant Bit) greatly exceeds the limit to the number of updates that can be made on the EEPROM 24. For this reason, in this embodiment, as shown in FIG. 9, setting 16 bits of data as one page for one data, three pages M1, M2 and M3 of data cells are provided. M1, M2 and M3 are updated sequentially at the period for time measurement. In other words, by performing count operations, the smallest unit of the data cell of one unit is three times the period for time measurement and the LSB is reduced to a third. Therefore, if counting up to the limit of 10000 updates is to be made, then up to a maximum of 30000 minutes (500 hours) can be counted using one page. Also, because the three pages of data cells are each counted sequentially at one-minute periods, the LSB of the time measurements as one minute is obtained by subtracting the data of M1, M2 and M3 from "FFFF" and adding the data of M1, M2 and M3 after conversion to countdown values. Here, it must be noted that "F", "E", "D" are equal to fifteenth, fourteenth and thirteenth digits, respectively, of the hexadecimal (base 16) system.

Figure 10:
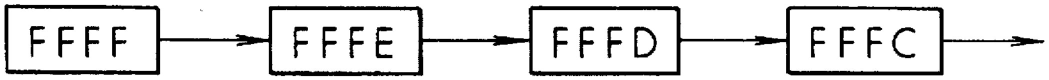
FIG. 10 is an explanatory drawing showing the count-down of data for each page of the EEPROM.

The data count, as shown in FIG. 9, involves counting the clocking period of the counter of EEPROM 24 which is one minute based on the internal timer of the CPU 21 after the start state or startup of the internal combustion engine when electric power is turned on. The counting process of EEPROM 24 is executed after each lapse of this one minute period. At the initial state of the EEPROM 24 (0 periods), the data for M1, M2 and M3 are all "FFFF" and counting is performed by counting down from this "FFFF" state. After the lapse of the first period of one minute, the data of M1 is updated from "FFFF" to "FFFE" while M2 and M3 data remain unchanged. Then, after the lapse of the second one-minute period, only the data of M2 is updated from "FFFF" to "FFFE" while the data of M1 and M3 are not changed. In the same way, in the next one-minute period which is the third period, only the data of M3 is updated from "FFFF" to "FFFE". In this way, as shown in FIG. 10, the countdown of the data cells of each of the pages is started from "FFFF" and is decremented sequentially to "FFFE", "FFFD", "FFFC" and so on. Therefore, only one page of data cell is updated for one period and there are no updates for one period which involve the data of two or more cells.

Figure 11:
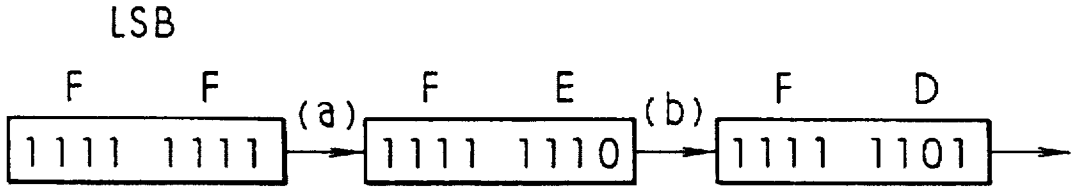
FIG. 11 is an explanatory drawing showing change of state of the lower byte of the data cells of each page of the EEPROM according to the first embodiment.

Next, the steps for counting down are explained using FIG. 11.

Figure 12:
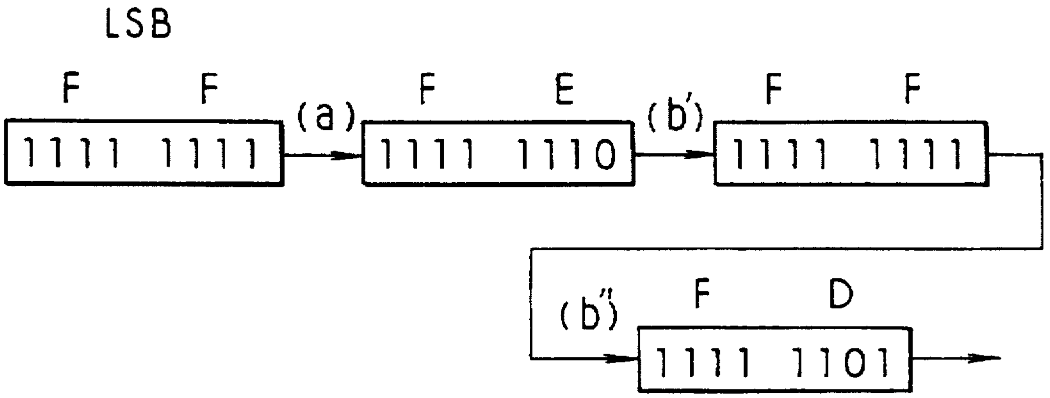
FIG. 12 is an explanatory drawing showing actual changes in the state of eight bits of the lower byte of the data cells of each page of the EEPROM.

Looking only at the lower eight bits of the lower byte of the cell, each cell can be transformed as shown in FIG. 11. Point (a) of FIG. 11 shows that the change from "FF" to "FE" is a change in the lowest cell, in other words, the change of the LSB from "1" to "0" which, as explained before, can be performed for each individual cell and is executable in one step. On the other hand, Point (b) of FIG. 11, which is the change from "FE" to "FD", involves changing the lowest-placed bit from "0" to "1" which, as explained before, is difficult to perform for just a particular cell and thus, the entire region has to be erased first (to an FF or all "1" state) before changes are made. In other words, changing "FE" into "FD" as shown in Point (b) of FIG. 11 is actually performed by first performing the erasure operation with the lower byte (8 bits) of the data as one unit so that, as shown in Point (b') of FIG. 12, data is reset first to "FF" and then, the change to "FD" is performed as shown in Point (b") of FIG. 12. Therefore, this kind of update is performed in two steps.

Figure 13A:
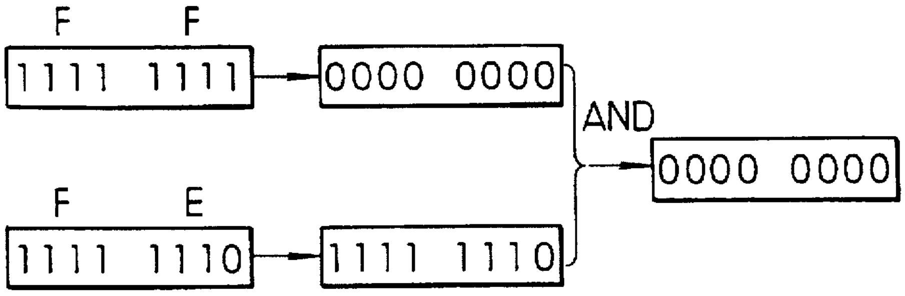
FIGS. 13A and 13B are explanatory drawings showing the need and lack of need of reset operations when updating data of the data cell of each page of the EEPROM according to the first embodiment.
Figure 13B:
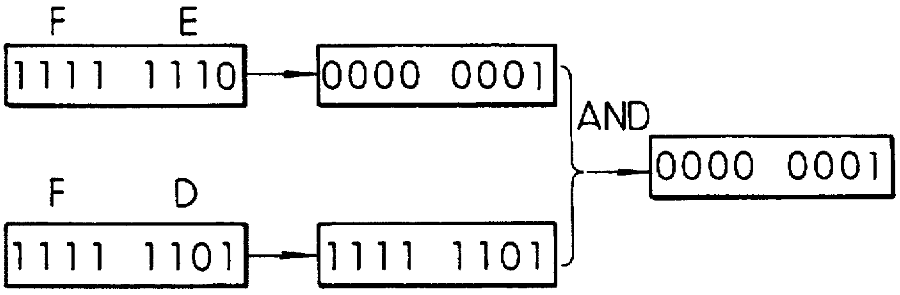

Next, the process of determining whether reset operations are needed or not during data update operations is explained using FIGS. 13A and 13B. Here, FIG. 13A shows an update that does not need resetting operations while FIG. 13B shows an update operation that needs the resetting procedure.

When updating data, determining whether resetting operations are needed or not is based on determining whether there is an update of the data cell from "0" to "1". In short, as shown in FIG. 13A, the data in the EEPROM 24 is inverted and if not all the cells are not "0" when the AND of the inverted result and the new data is taken, then it is determined that reset operations are not needed. On the other hand, as shown in FIG. 13B, the data in the EEPROM 24 is inverted and if not all the cells are "0" when the AND of the inverted result and the new data is taken, then it is determined that reset operations are needed.

In this way, when updating the data of the EEPROM 24, performing such an operation reduces the number of reset operations. While a countdown of the EEPROM 24 is being performed for this embodiment for the measurement of time, it must be noted that reset operations are not needed for odd-numbered count operations. On the other hand, reset operations are needed for even-numbered operations.

Figure 14:
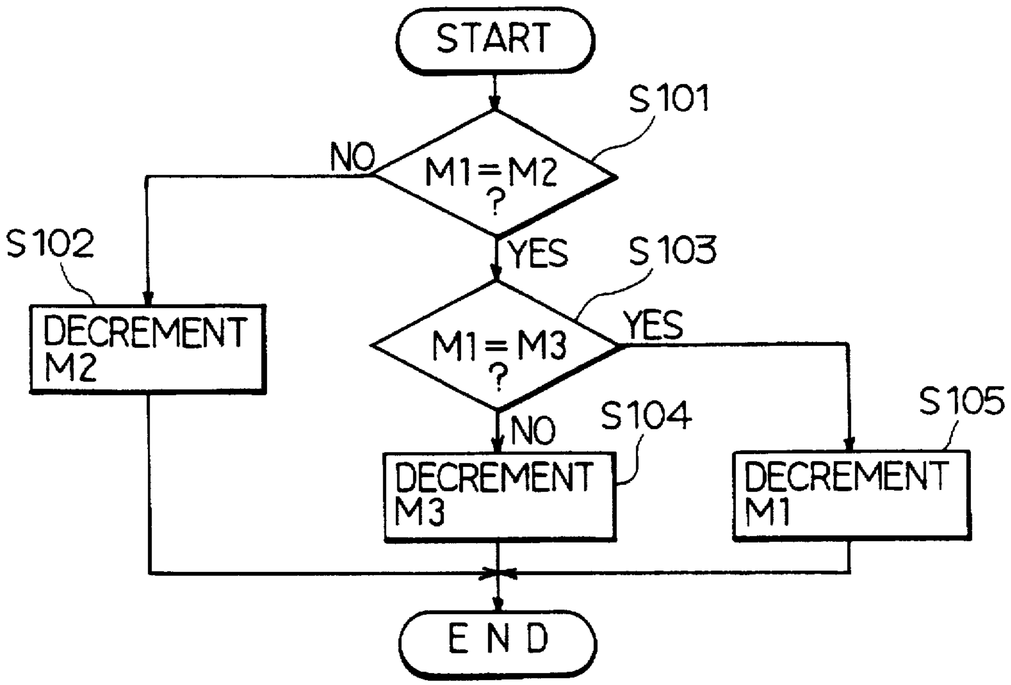
FIG. 14 is a flowchart showing the processing procedure for sequentially updating the data of the data cells of each page of the EEPROM according to the first embodiment.
Figure 15:
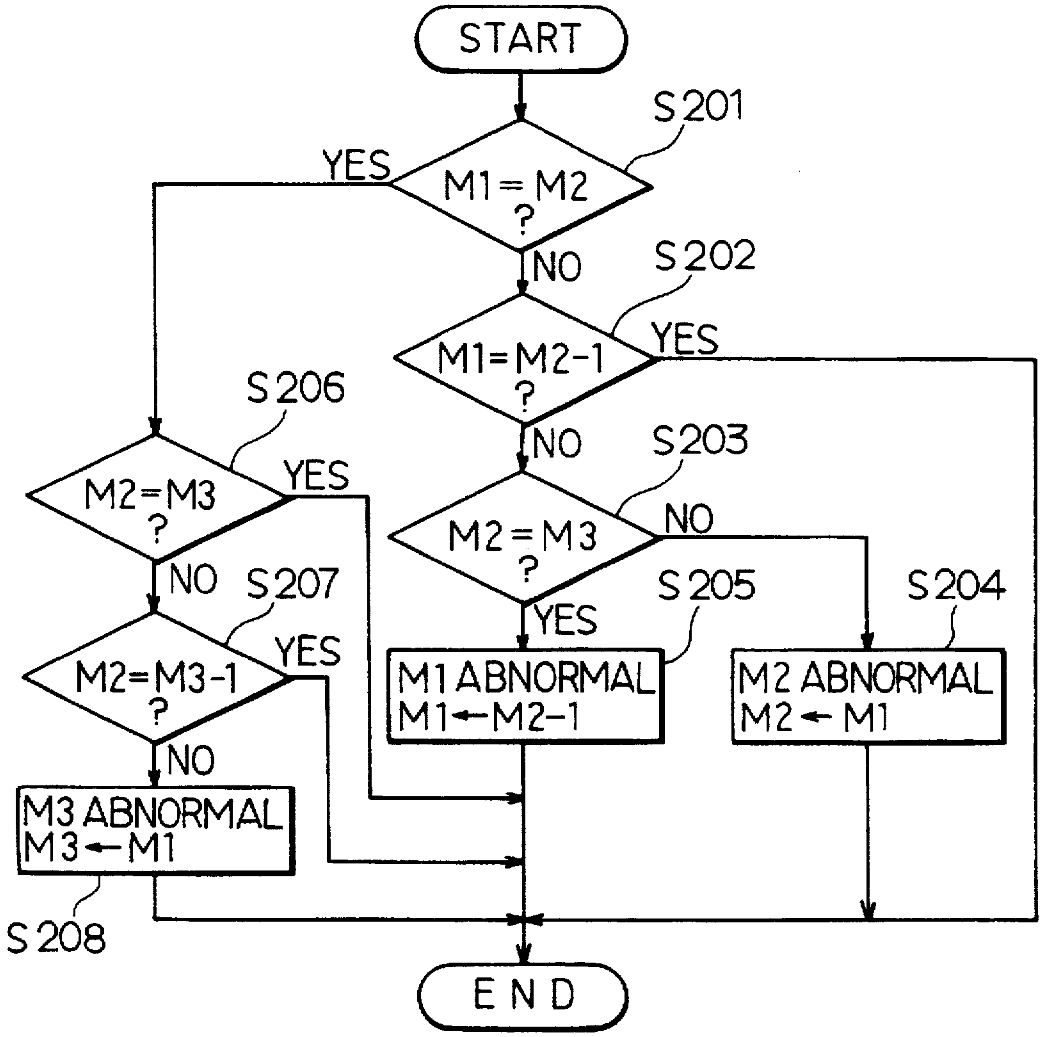
FIG. 15 is a flowchart showing the processing procedure of the initial processing routine which is executed first at the start of the programs in the CPU according to the first embodiment.

Next, the processing procedure of the CPU 21 used in the internal combustion engine operational history storage device according to this embodiment of the present invention is explained using FIGS. 14 and 15.

FIG. 14 is a flowchart that shows the process of sequentially updating the data of three pages of data cells M1, M2 and M3. Because three pages of data cells M1, M2 and M3 are provided for the countdown of one data, the relationship between the data of each of the pages would always be any of the following: M1=M2=M3, M1<M2 and M2=M3 or M1=M2 and M2<M3. Therefore, when performing the countdown of the data of EEPROM 24 with the lapse of the time measurement period, the page of the data cell to be updated is known by comparing the data of each of the pages.

Step S101 determines whether M1=M2. If not, in other words, when M1<M2, control proceeds to step S102 where the data cell of M2 is decremented and the program's execution ends. On the other hand, if the result of the comparison in step S101 is affirmative, then control proceeds to step S103 which determines whether M1=M3. If the result of the comparison in step S103 is negative, in other words, when M1<M3, control proceeds to step S104 where M3 is decremented and program execution finishes. It must be noted here that the condition for step S103 can be changed from M1=M3 to M2=M3. Meanwhile, if step S103 gives a positive output, control proceeds to step S105 where M1 is decremented and program execution finishes.

FIG. 15 is a flowchart of the data restoration process when an irregularity in the data of the EEPROM 24 is determined for the case where electric power supply to the electric power source circuit 7 is cut-off during the update of the data of EEPROM 24. When electric power is turned off while updating the data of EEPROM 24, irregularity in the data of the EEPROM 24 is determined by checking if any of the following conditions hold: M1=M2=M3, M1<M2 and M2=M3 or M1=M2 and M2<M3. Also, because the data of each of the data cells are updated sequentially at the period for time measurements, then there is no possibility that all data cells are updated at the same time and thus, data irregularity due to the switching off of the device occurs for only one of the data cells. The procedure for checking if the data of the EEPROM 24 is normal or not is executed as one part of the initial routine shown in FIG. 15 which is executed at the start-up of the program of CPU 21. In other words, the following processes are executed when the electric power of the device is turned on and the initial routine is activated.

Step S201 checks whether M1=M2. If not, then control proceeds to step S202 which checks whether M1=M2−1. The condition of step S202 is satisfied for the case when the electric power of the device is turned off after the data of M1 is modified but before the data of M2 is modified and thus, all data are determined to be normal and the execution of this program terminates. On the other hand, if the condition of step S202 is not satisfied, control proceeds to step S203 which determines whether M2=M3. If the condition of step S203 is not satisfied, then control proceeds to step S204 where the irregularity of the data of M2 is identified because power was turned off while counting the data of M2 and the same M2 data is restored. In short, updating the data of M2 means that the new data is equal to the data of M1 and thus the data of M1 is written in M2 when restoring M2 data.

On the other hand, if the condition of step S203 is satisfied, control proceeds to step S205 where it is determined that the data of M1 is abnormal because power was turned off while updating the data of M1 and thus, the data of M1 is restored. In short, power cutoff while updating the data of M1 means that M1 was to be counted down by one more cycle. Thus, in restoring the data of M1, data that is one unit smaller than the data of M2 or M3 is written in M1 and the execution of the program terminates.

Meanwhile, when the condition of step S201 is satisfied, control proceeds to step S206 which determines whether M2=M3. Satisfaction of the condition of step S206 means that M1=M2=M3 and thus, data is determined to be normal and execution of the program ends. On the other hand, if the condition of step S206 is not satisfied, control proceeds to step S207 which determines whether M2=M3−1. Satisfaction of the condition of step S207 means that all the data are normal with the cutoff of the power happening after counting the data of M2 but before counting M3 data and thus, the execution of the program terminates.

On the other hand, if the condition of step S207 is not satisfied, control proceeds to step S208 where it is determined that electric power cutoff happened during the counting of the data of M3 and thus, the data of M3 should be restored because it is abnormal. In short, updating the data of M3 means that it should be updated to the data of M1 or M2 and thus, the data of M1 or M2 are written in M3 and the execution of the program terminates. The determination condition of step S207 can also be M1=M3−1. In this way, data of the cells are restored in a simple manner even if they are destroyed when the electric power is turned off.

In this way, for the device for measuring time using the EEPROM 24, the internal combustion engine operational history storage device of the present invention includes data regions M1, M2, M3 which store data for one measurement item and which are provided in the EEPROM 24, a counting device implemented through CPU 21 which sequentially counts at the smallest time unit of one minute the data stored in the data regions and a measurement data computation device which is implemented through CPU 21 which treats as measured data the total of the data stored in the data regions.

Therefore, data regions M1, M2 and M3 are formed based on the maximum count value and the smallest time unit demanded for each measurement item and data stored in each of data regions M1, M2 and M3 are counted sequentially and updated at the smallest time unit of one minute. Adding the count values of the M1, M2 and M3 data regions results in one measurement data and thus, the required counts are performed within the limit to the number of updates of the EEPROM 24.

Thus, using the EEPROM 24 for the time measurements, both the maximum count value and the smallest time unit are satisfied.

Moreover, through comparison of the data stored in data regions M1, M2 and M3, the internal combustion engine operational history storage device of the present embodiment further includes a data restoration device that restores data of one data region that was determined to be irregular based on the data of the other data regions using CPU 21.

Therefore, because only the data of one data region among the three data regions of M1, M2 and M3 are destroyed when electric power is turned off when updating data, then the destroyed data can be restored by simple comparison with the data of the other data regions.

Thus, this data restoration process is a simple process which involves the mutual use of the three data regions and which restores data at a high-speed without affecting the other processes.

In addition, the counting device of the internal combustion engine operational history storage device of the present embodiment sets reset state "FFFF" of the EEPROM 24 as the initial state and performs countdown from this reset state "FFFF".

Therefore, because reset operations are not needed for the data of data regions M1, M2 and M3 when updating from "1" to "0" is performed, there are less reset operations when counting down as compared to the case of counting up.

Thus, faster processing with fewer reset operations when counting down from the reset state lessens the effect on the other processes.

Furthermore, during its countdown operation, the counting device of the internal combustion engine operational history storage device determines the need for resetting of the EEPROM 24 and performs the resetting operation on the data only when needed.

Therefore, because reset operations are not needed when changing the data of the data regions M1, M2 and M3 of the EEPROM 24 from "1" to "0", the number of reset operations is reduced by determining beforehand the need for resetting during countdown operations.

In this way, faster processing with fewer resetting operations is implemented by determining beforehand the need for resetting operations during countdown.

Furthermore, during countdown operations, the counting device of the internal combustion engine operational history storage device of the present embodiment omits resetting operations during odd-numbered operations of the EEPROM 24 while performing the same resetting operations for even-numbered operations.

Thus, when performing countdown operations, odd-numbered operations counted from the reset state of the EEPROM 24 do not need reset operations because data in the data regions of M1, M2 and M3 are updated from "1" to "0". On the other hand, for even-numbered operations, reset operations are done first before updating.

Therefore, with reset operations not needed for odd-numbered operations, resetting is done only every other time and thus, the number of such operations is reduced to half. As a result, the effect on the other processes is eliminated.

Meanwhile, while determining the need for reset operations is performed to speed up operations during countdown operations in which the initial state of the EEPROM 24 is the reset state, reset operations can also be done every time when the maximum number of counts is low and when it does not affect the other processes. It must be noted here that for such non-conditional execution of reset operations, increment operations wherein the initial state of the EEPROM 24 is the renewable state can also be employed.

Although the present invention has been fully described in connection with preferred embodiments thereof with reference to accompanying drawings, it is to be noted that various changes and modifications will become apparent to those skilled in the art. Such changes and modifications are to be understood as being within the scope of the present invention as defined by the appended claims.

What is claimed is:

1. A vehicular information storage device comprising:

storage means for storing information therein and retaining said stored information even during electric power cut-off;

extracting means for processing information needed for analysis and maintenance of vehicular and internal combustion engines, said processed information relating to a predetermined period of time, and for extracting said information at a predetermined time interval;

determining means for determining from among regions set beforehand a region of information to which information extracted by said extracting means belongs;

counting means for incrementing a counter in a predetermined storage region of said storage means in correspondence with a region determined by said determining means; and data restoration means for restoring a count value of said counter in said predetermined storage region based on count values of other storage regions after an irregularity is determined in data of said predetermined region through comparison of data stored in said storage regions.

2. The device of claim 1 wherein said extracting means is for extracting one of maximum and minimum values of said processed information within said predetermined time interval.

3. The device of claim 1 wherein said determining means is for determining a storage region based on an amount of change in information within said predetermined period of time.

4. An internal combustion engine operational history storage device which measures time using an EEPROM, said device comprising:

at least three data regions in said EEPROM to store data for a measurement item;

counting means for counting data stored in said data regions;

data computing means for processing as measured data a total of data counted by said counting means and stored in said data regions; and data restoration means for restoring a count value for a first data region based on count values of other data regions after an irregularity is determined in data of said first data region through comparison of data stored in said data regions.

5. The device of claim 4 wherein said counting means is for performing countdown operations starting from a reset state of said EEPROM with said reset state as an initial state.

6. The device of claim 5 wherein, during countdown operations, said counting means is for determining whether there is a need to reset said EEPROM and performs resetting only when needed.

7. The device of claim 5 wherein said counting means omits resetting operations and performs resetting operations during alternating operations.

8. The device of claim 4 wherein said counting means is for performing countdown operations starting from a reset state of said EEPROM with said reset state as an initial state.

9. The device of claim 8 wherein, during countdown operations, said counting means is for determining whether there is a need to reset said EEPROM and performs resetting only when there is a need.

10. The device of claim 8 wherein said counting means omits resetting operations during odd-numbered operations and performs resetting operations during even-numbered operations.

11. An automotive data acquisition system comprising:

extracting means for processing and extracting information needed for analysis and maintenance of vehicular and internal combustion engines at a predetermined time interval, said information relating to a predetermined period of time;

a first memory for storing data therein;

determining means for determining which of a plurality of predetermined categories to which said extracted information belongs;

first modifying means for modifying data in a predetermined storage region of said first memory, said predetermined storage region corresponding to one of said predetermined categories to which said extracted information belongs, said first modifying means including counting means for incrementing a counter in correspondence with a category determined by said determining means; and restoration means for restoring a count value for said predetermined storage region based on count values of other storage regions after an irregularity is determined in data of said predetermined storage region through comparison of data stored in said storage regions.

12. The system of claim 11, wherein:

said system includes first timer means for timing a first predetermined time period, said extracting means being responsive to said first timer means;

said determining means includes comparison means for comparing said extracted information to previously extracted information; and said predetermined categories are representative of normal and abnormal states of an automobile engine.

13. The system of claim 11, further comprising:

second timer means for timing a second predetermined time period;

a second memory for storing data therein;

second modifying means for, responsive to said second timer means, modifying data in said second memory based on data in said first memory.

14. A vehicular information storage device comprising:

storage means for storing information therein and retaining said stored information even during electric power cut-off;

extracting means for processing information needed for analysis and maintenance of vehicular and internal combustion engines, said processed information relating to a predetermined period of time, and for extracting said information at a predetermined time interval;

determining means for determining from among regions set beforehand a region of information to which information extracted by said extracting means belongs;

counting means for incrementing a counter in a predetermined storage region of said storage means in correspondence with a region determined by said determining means, for omitting resetting said storage means during a first set of operations, said first set of operations being one of odd-numbered operations and even-numbered operations, and for resetting said storage means during a second set of operations, said second set of operations being the other of said odd-numbered operations and said even-numbered operations.

15. An internal combustion engine operational history storage device which measures time using an EEPROM, said device comprising:

at least three data regions in said EEPROM to store data for a measurement item;

counting means for counting data stored in said data regions, for resetting said EEPROM during a first set of operations, said first set of operations being one of odd-numbered operations and even-numbered operations, and for omitting resetting of said EEPROM during a second set of operations, said second set of operations being the other of said odd-numbered operations and said even-numbered operations; and data computing means for processing as measured data a total of data counted by said counting means and stored in said data regions.

16. The device of claim 15 wherein said counting means is for performing countdown operations starting from a reset state of said EEPROM with said reset state as an initial state.

17. The device of claim 16, wherein, during countdown operations, said counting means is for determining whether there is a need to reset said EEPROM and performs resetting only when needed.

18. The device of claim 16 wherein said counting means omits resetting operations and performs resetting operations during alternating operations.

19. The device of claim 15, further comprising:

data restoration means for restoring a count value for a first data region based on count values of other data regions after an irregularity is determined in data of said first data region through comparison of data stored in said data regions.

20. The device of claim 19 wherein said counting means is for performing countdown operations starting from a reset state of said EEPROM with said reset state as an initial state.

21. The device of claim 20 wherein, during countdown operations, said counting means is for determining whether there is a need to reset said EEPROM and performs resetting only when there is a need.

22. An automotive data acquisition system comprising:

extracting means for processing and extracting information needed for analysis and maintenance of vehicular and internal combustion engines at a predetermined time interval, said information relating to a predetermined period of time;

a first memory for storing data therein;

determining means for determining which of a plurality of predetermined categories to which said extracted information belongs;

first modifying means for modifying data in a predetermined storage region of said first memory, said predetermined storage region corresponding to one of said predetermined categories to which said extracted information belongs, said first modifying means including counting means for incrementing a counter in correspondence with a category determined by said determining means, for omitting resetting said first memory during a first set of operations, said first set of operations being one of odd-numbered operations and even-numbered operations, and resetting said first memory during a second set of operations, said second set of operations being the other of said odd-numbered operations and said even-numbered operations.

* * * * *